United States Patent
Holland et al.

(10) Patent No.: US 11,860,027 B2
(45) Date of Patent: Jan. 2, 2024

(54) WEIGHT MEASUREMENT SYSTEM, WEIGH HEAD APPARATUS AND METHODS

(71) Applicant: Duradiamond Software Limited, Dunning (GB)

(72) Inventors: James William Holland, Edinburgh (GB); James John Edward Pugh, Dunning (GB)

(73) Assignee: Duradiamond Software Limited, Dunning (GB)

( * ) Notice: Subject to any disclaimer, the term of this patent is extended or adjusted under 35 U.S.C. 154(b) by 88 days.

(21) Appl. No.: 17/435,677

(22) PCT Filed: Feb. 26, 2020

(86) PCT No.: PCT/GB2020/000023
§ 371 (c)(1),
(2) Date: Sep. 1, 2021

(87) PCT Pub. No.: WO2020/178541
PCT Pub. Date: Sep. 10, 2020

(65) Prior Publication Data
US 2022/0136887 A1 May 5, 2022

(30) Foreign Application Priority Data

Mar. 4, 2019 (GB) .................................... 1902880

(51) Int. Cl.
*G01G 17/08* (2006.01)
*G01G 23/18* (2006.01)

(52) U.S. Cl.
CPC ............. *G01G 17/08* (2013.01); *G01G 23/18* (2013.01)

(58) Field of Classification Search
CPC ............................... G01G 17/08; G01G 23/18
See application file for complete search history.

(56) References Cited

U.S. PATENT DOCUMENTS

| 9,226,481 | B1 * | 1/2016 | Paripati | .................. | G01G 17/08 |
| 2004/0133385 | A1 * | 7/2004 | Lunenburg | ............. | G01G 23/00 |
| | | | | | 702/173 |

(Continued)

FOREIGN PATENT DOCUMENTS

| CN | 202614345 U | 12/2012 |
| CN | 204007817 U | 12/2014 |

(Continued)

*Primary Examiner* — Natalie Huls
(74) *Attorney, Agent, or Firm* — Mahamedi IP Law LLP (57) ABSTRACT

A weigh head apparatus (102) for cooperation with a data processing unit for use in livestock weighing. The weigh head apparatus is inexpensive, easy to upgrade and has low maintenance costs. The weight head apparatus has: a signal converting module (106) operable to convert one or more analogue load signal into a plurality of digital load values; and a data transmitting module (108) operable to transmit a stream of the digital load values over a wireless connection to the data processing unit. The stream is a real-time stream and the digital load values are raw instantaneous analogue-to-digital converter output values. A command receiving module (109) is configured to receive a transmit-stream command from the data processing unit, wherein the data transmitting module (108) is operable to transmit the stream of the digital load values in response to the received transmit-stream command.

14 Claims, 3 Drawing Sheets

(56) References Cited

U.S. PATENT DOCUMENTS

| | | | | |
|---|---|---|---|---|
| 2018/0242889 A1* | 8/2018 | Izumo | .................. | A61B 5/1126 |
| 2019/0373854 A1* | 12/2019 | Satoh | .................. | A01K 11/006 |
| 2020/0240828 A1* | 7/2020 | Vasconcelos | ........ | A01K 11/006 |
| 2020/0319014 A1* | 10/2020 | Mitchell | ............... | A01K 11/006 |
| 2021/0007330 A1* | 1/2021 | Huisma | .................. | G06Q 50/02 |

FOREIGN PATENT DOCUMENTS

| | | |
|---|---|---|
| CN | 105654313 A | 6/2016 |
| CN | 107796499 A | 3/2018 |
| CN | 208187518 U | 12/2018 |
| CN | 208333639 U | 1/2019 |
| EP | 3093630 B1 | 9/2017 |
| JP | 2003114145 A | 4/2003 |
| WO | 2012094851 A1 | 7/2012 |
| WO | 2015184198 A1 | 12/2015 |
| WO | 2017011889 A1 | 1/2017 |
| WO | 2017066857 A1 | 4/2017 |

\* cited by examiner

WEIGHT MEASUREMENT SYSTEM, WEIGH HEAD APPARATUS AND METHODS

FIELD OF INVENTION

The present invention relates to a weight measurement system, a weigh head apparatus and a weight measurement method for use in livestock weighing, suitable for applications in health management for livestock farming.

BACKGROUND ART

Determination of livestock weight is an important aspect of managing livestock health and reproduction, which also contributes to decisions relating to livestock feeding, handling and selling in order to achieve successful outcomes and maximise profits of agricultural enterprises.

In the livestock industry, to obtain a measurement of weight with an existing weighing system, three basic steps are involved: (1) filtering analogue load signals generated by load cells (known as "weigh bars" within the agricultural sector); (2) converting the analogue load signal to digital load values using an analogue-to-digital converter; and (3) processing the digital load values with a calibration curve or constant and determining when the animal movement has stabilised to produce a final stable and calibrated weight. These steps are conventionally performed by a unit called a "weigh head", connected to the weigh bars. The weigh head has a display to present the stable weight to a user.

A problem with existing weigh heads is that high purchase and maintenance costs prohibit many users (e.g. farmers) from being able to afford the weigh heads. The problem is attributed to the fact that firmware, which is used to accomplish all the aforementioned steps to produce a calculated stable weight value, is locally installed within the weigh head. A consequence of this is that the weigh head needs a relatively powerful processor, a keyboard and a display. Also, a power supply adequate for the processor and display has to be provided.

Another problem with the existing weigh heads is that having firmware locally installed makes upgrades and "future proofing" of the system difficult and expensive. Specialist actions are required for upgrading the system or a new weigh head has to be purchased in order to expand functionality.

Additionally, an existing weigh head with built-in firmware is likely to suffer from compatibility issues between new firmware and old versions of the complex hardware.

Furthermore, existing weigh heads require a user intervention to export the calculated stable weight value stored in the weigh head to another device for further analysis, which is inconvenient, and can be error-prone and time-consuming. For example, the weigh head may have to be detached from the weigh bars and carried to the farm office and connected to a computer.

There is poor integration between existing weigh heads and other farm data applications (e.g. farm software). Currently these weigh heads generally require the user to manually transfer data between the weigh heads and other applications in order to create a complete farm or herd data set which can be analysed.

There is an environmental impact of existing weigh heads which, as they are based around bespoke hardware, require new hardware to be purchased in order to increase functionality. Additionally, because the weigh head needs to perform the full range of functions it uses a greater number of components.

SUMMARY OF INVENTION

It is desirable to provide a weight measurement system for use in livestock weighing that is viable, inexpensive and easy-to-upgrade and has low maintenance costs.

According to a first aspect of the present invention, there is provided a weigh head apparatus for cooperation with a data processing unit for use in livestock weighing, the weigh head apparatus comprising:
  a signal converting module operable to convert one or more analogue load signal into a plurality of digital load values; and
  a data transmitting module operable to transmit a stream of the digital load values over a wireless connection to the data processing unit.

Preferably, the stream is a real-time stream and the digital load values are raw instantaneous analogue-to-digital converter output values.

Preferably, the weigh head apparatus further comprises a command receiving module configured to receive a transmit-stream command from the data processing unit, wherein the data transmitting module is operable to transmit the stream of the digital load values in response to the received transmit-stream command.

Preferably, the weigh head apparatus further comprises a connector to a device other than the data processing unit and the weigh head apparatus is operable to relay commands and/or data between the data processing unit and the other device.

According to a second aspect of the present invention, there is provided a method for cooperation with a weigh head apparatus of any preceding claim for use in livestock weighing, the method comprising:
  wirelessly connecting to a weigh head apparatus;
  wirelessly receiving a stream of digital load values from the weigh head apparatus; and
  processing the stream of digital load values to calculate a measurement of weight.

Preferably, the stream is a real-time stream and the digital load values are raw instantaneous analogue-to-digital converter output values.

Preferably, the method further comprises wirelessly transmitting a transmit-stream command to the weigh head apparatus, wherein the transmit-stream command is configured to cause the weigh head apparatus to transmit the stream of digital load values over a wireless connection, and wherein the digital load values are converted by the weigh head apparatus from one or more analogue load signal.

Preferably, the measurement of weight is a stable weight, calculated based on variation of the digital load values.

Preferably, the method further comprises obtaining calibration data and using the obtained calibration data to calculate the measurement of weight.

Preferably, using the obtained calibration data to calculate the measurement of weight comprises transmitting calibration data wirelessly from the data processing unit to the weigh head apparatus.

According to a third aspect of the present invention, there is provided a one or more computer program comprising computer readable instructions which, when run on suitable computer apparatus, cause the computer apparatus to perform the method of the second aspect.

According to a fourth aspect of the present invention, there is provided a weight measurement system for use in livestock weighing, the apparatus comprising:
- a weigh head apparatus according to the first aspect;
- a computer apparatus comprising a data processing unit; and
- one or more computer program according the third aspect.

According to a fifth aspect of the present invention, there is provided a weight measurement method for use in livestock weighing, the method comprising:
- converting one or more analogue load signal into a plurality of digital load values;
- transmitting a stream of the digital load values over a wireless connection to a data processing unit;
- wirelessly receiving the stream of digital load values; and
- processing the stream of digital load values to calculate a measurement of weight.

Preferably, the method further comprises:
- wirelessly transmitting a transmit-stream command from the data processing unit to the weigh head apparatus; and
- receiving the transmit-stream command, and wherein the step of transmitting the stream of the digital load values is performed responsive to the receiving of the transmit-stream command.

Preferably, the stream is a real-time stream and the digital load values are raw instantaneous analogue-to-digital converter output values.

Preferably, the measurement of weight is a stable weight, calculated based on variation of the digital load values.

Preferably, the method further comprises obtaining calibration data and using the obtained calibration data to calculate the measurement of weight.

Preferably, using the obtained calibration data to calculate the measurement of weight comprises transmitting calibration data wirelessly from the data processing unit to the weigh head apparatus.

According to a sixth aspect of the present invention, there is provided one or more computer program comprising computer readable instructions which, when run on suitable computer apparatus, cause the computer apparatus to perform the method of the fifth aspect.

According to a seventh aspect of the present invention, there is provided one or more computer program product comprising the one or more computer program of the third aspect.

According to an eighth aspect of the present invention, there is provided one or more computer program product comprising the one or more computer program of the sixth aspect.

BRIEF DESCRIPTION OF DRAWINGS

Embodiments of the present invention will now be described, by way of example only, with reference to the drawings, in which.

DESCRIPTION OF EMBODIMENTS

Embodiments provide a weight measurement system for use in livestock weighing comprising a weigh head apparatus and a data processing unit.

In an embodiment of the present invention, a weigh head apparatus is wirelessly tethered directly to a mobile device using Bluetooth with key data processing/analysis undertaken within the mobile device using digital load values continuously transmitted from the weigh head apparatus over the wireless link. In practice this means that the weigh head apparatus is only utilised to provide power to the externally connected load cells, undertake filtering of the analogue load signal, analogue to digital (A2D) conversion and then transmission of uncalibrated digital load values (i.e. raw A2D counts) over Bluetooth Low Energy (BLE). The uncalibrated digital load values are then processed within the mobile device into calibrated weight values using a calibration curve that is either pre-defined or locally determined using a calibration process built into the software on the mobile device. This then creates a stream of calibrated weight values which are processed, enabling an accurate stable calibrated weight to be determined for the animal and presented via the user interface (UI) running on the mobile device, even with the animal being in constant motion on the load cells.

In contrast, conventional weigh heads undertake all steps necessary to determine a stable calibrated weight, locally within specialist hardware and then display the weight on a screen built into the weigh head. Some conventional devices do also allow these stable calibrated weights to be transmitted wirelessly (via WiFi or Bluetooth) to a third-party mobile device e.g. mobile phone or tablet, however, these devices are not actively involved in the weigh calculation process and only receive the final computed stable calibrated weight.

In an example embodiment, the following steps are performed:

1. On initial installation users can configure the weigh head apparatus to use specific 'baked in' weigh bar hardware or to calibrate an unknown bar (based on loading a known weight).
2. The load cell(s) of the weigh bar(s) is/are energised by the weigh head apparatus.
3. The returning signal voltage is amplified, filtered and then digitized by a 24-bit A/D converter to produce a digital load value, which is uncalibrated at this stage. In another embodiment, this digital load value may be calibrated in the weigh head apparatus using a calibration constant or calibration function.
4. The resulting data packet comprising the digital load value is then transmitted from the weigh head apparatus over Bluetooth Low Energy or RS232 link to the connected mobile device (data processing unit).
5. The app on the mobile device then decodes the data packet and processes it. This processing may preferably include transforming an uncalibrated digital load value to a calibrated digital weight value in the mobile device, e.g. using a calibration constant or calibration curve or function. The calibration constant or curve may be calculated on the mobile device and then either held on that device and used to calibrate raw analogue-to-digital values streamed from the weigh head or the calibration constant or curve could be pushed down from the mobile device to the weigh head via a command to enable the streaming of calibrated digital load values representing weights.
6. The algorithm used has a number of tunable parameters that are initialised when the animal species is selected. This allows the app to dynamically optimise the algorithm to allow for the selected species.

7. After a short period of time (variable with the amount of animal movement) a 'stable' weight is calculated and displayed.
8. Users can then scan an EID (electronic identifier) tag (or manually enter) to record the stable weight against that animal.

Embodiments avoid the aforementioned problems by dedicating the weigh head apparatus to the steps of filtering analogue inputs and converting the analogue load signals into digital data; the step of processing the digital data to calculate a measurement of weight is instead carried out by software installed on the data processing unit (e.g. mobile phone, tablet, etc.). This ensures that software updates can be performed easily and automatically, which also makes "future proofing" of the apparatus straightforward and cost-effective, without the need to replace the weigh head apparatus or have specialist upgrades.

In the Figures, elements labelled with reference numerals found in preceding Figures represent the same elements as described for the respective preceding Figure. For example, feature 112 in FIG. 2 would be described in the same way as feature 112 in FIG. 1.

Figure 1:
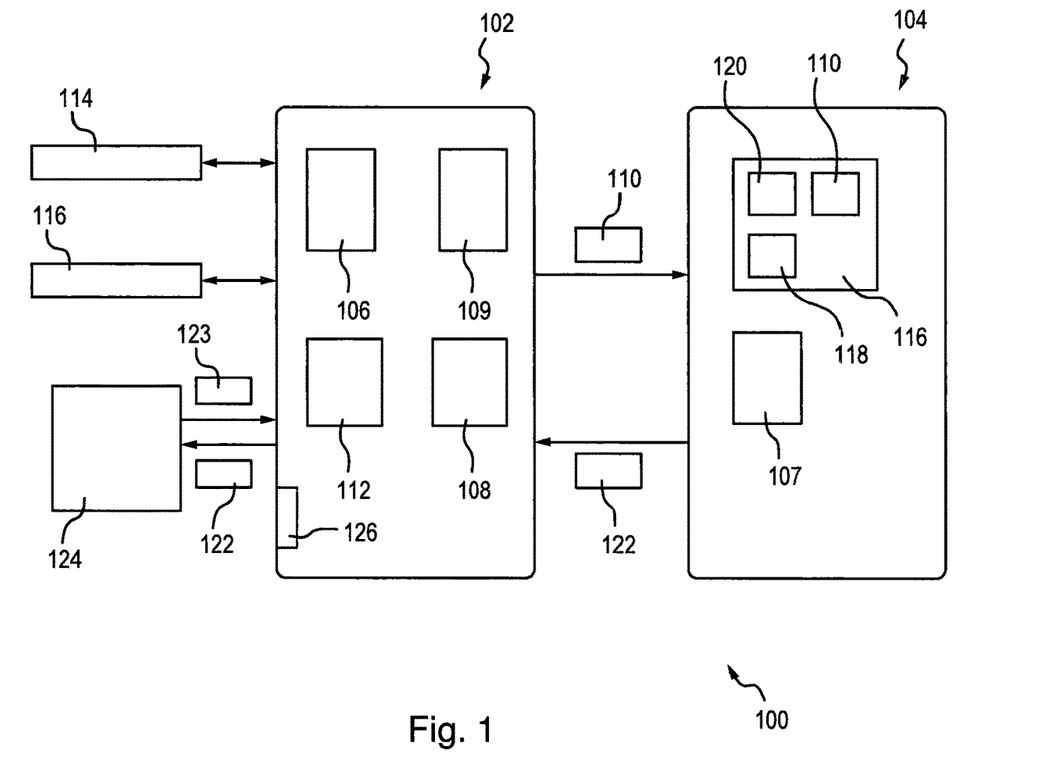
FIG. 1 illustrates, in schematic form, a weight measurement system according to an embodiment of the present invention.

FIG. 1 illustrates, in schematic form, a weight measurement system according to an embodiment of the present invention, wherein the system 100 comprises a weigh head apparatus 102 in cooperation with a data processing unit 104 (e.g. a mobile device). The weigh head apparatus is display-less. The weigh head 102 comprises a signal converting module 106 configured to convert one or more analogue load signal into a plurality of digital load values and a data transmitting/receiving module 108 configured to transmit a stream of the digital load values over a wireless connection (e.g. Bluetooth Low Energy) to the data processing unit 104. In this example, the stream is preferably a real-time stream and the digital load values are raw instantaneous analogue-to-digital converter output values. In other examples, the digital load values may be for example time-averaged and/r buffered in the weigh head 102.

The weigh head has a command receiving module 109 configured to receive a transmit-stream command from the data processing unit via the transmitting/receiving module 108. The data transmitting/receiving module 108 is operable to transmit the stream of the digital load values in response to the received transmit-stream command.

The data processing unit 104 is configured to wirelessly receive the continuous stream of the digital load values 110 by a data transmitting/receiving module 107 and process the digital load values 110 with calibration data 118 to calculate a measurement of weight. The calibration data may be for example a calibration constant or a calibration curve or function.

The apparatus in an example allows the data processing unit 104 to be configured on an initial installation with pre-defined or customised calibration data. The calibration data corresponds to one or more load cells 114 and 116 and is used for processing the digital load values converted from the analogue load signal generated by the corresponding one or more load cells 114 and 116.

The apparatus in another example allows the weigh head apparatus 102 to be configured on an initial installation with the pre-defined or customised calibration data. The calibration data can then be retrieved from the weigh head apparatus for use in calculating calibrated measurements of weight by the data processing unit 104.

In embodiments, the processing may be tuned to adapt to weighing a category of species (e.g. sheep, cow, etc.), in order to ensure accuracy of the measured weight for the category.

As illustrated in FIG. 1, the calibration data 118 used to calculate a calibrated measurement of weight is preferably stored in a memory module 116 of the data processing unit 104. In another example, the data processing unit 104 may wirelessly obtain calibration data stored in a memory module 112 of the weigh head apparatus 102. Embodiments allow the data processing unit 104 to obtain the calibration data that may be stored in an external memory (e.g. a SD card) or in either of the memory modules 112 and 116 of the respective units 102 and 104. In other embodiments, the data processing unit 104 executes a calibration process to generate a calibration constant or function by prompting the user for and controlling the measurement of known weights.

The calculation of the calibration constant or curve may be preferably performed on the data processing unit. Additionally, or alternatively, in an embodiment, the calculation of the calibration constant or curve may be performed on the weigh head apparatus. In this case the data processing unit may obtain calibration data and use it to calculate the measurement of weight indirectly by transmitting calibration data wirelessly from the data processing unit to the weigh head apparatus. The calibration data may be for example a calibration mass and the data processing unit may instruct the user to place a corresponding physical mass on a platform supported by the load bars and may send a command to the weigh head to acquire an uncalibrated digital load signal and to calculate further calibration data such as a calibration constant or a calibration curve (using multiple masses).

Software 120 (a computer program) stored in the memory module 116 of the data processing unit 104, is run to process the digital load values 110 that are wirelessly transmitted from the weigh head apparatus 102 and stored locally within the data processing unit 104 (e.g. in the memory module 116). In this example, the digital load values 110 are arranged into a circular buffer that may have a fixed maximum size. A dynamic ring buffer may be used to damp the incoming data feed by a variable amount. The span of data in the buffer is calculated as a new data packet arrives. When the span reaches a low threshold, the data is deemed to be stable and a stable calibrated weight is calculated with reference to the calibration curve.

In an example, to determine a stable weighing state, variances of the buffered digital load values of some determined length may be computed and a pre-defined or automatically-adjusted threshold may be applied to the computed variances. Thus, the stable weight is calculated based on variation of the digital load values. With use of the calibration data 118 obtained by the data processing unit 104, a stable and calibrated weight value can be derived based on the stable weighing state. The calibrated stable weight value may be presented via a user interface on a display of the data processing unit 104.

In another embodiment of the present invention (not shown), the digital load values 110 may be wirelessly transmitted from the data processing unit 104 to a cloud service, wherein the cloud service processes the digital load values 110 and calculates a calibrated stable weight with the calibration data obtained by the cloud service. The measurement of weight is preferably returned to the data processing unit 104 for storage and further analysis. In this embodiment, the computer apparatus for running one or more computer program comprises the cloud servers operating the cloud service in combination with the data processing apparatus.

The weigh head apparatus 102 may be used as a smart hub for the data processing unit 104 to receive data 123 from, and issue commands 122 to, another device 124 (e.g. an ear tag reader). This allows an animal's weight to be integrated with data 123 in relation to the animal that is provided by the other device 124, including ear tag ID, geographical location, serial numbers of the load cells and methods of drafting the animal, so as to achieve optimal livestock health management. Connection of the weigh head apparatus 102 with another device 124 can be realised via a serial port 126 or wirelessly by the data transmitting/receiving module 108.

Figure 2:
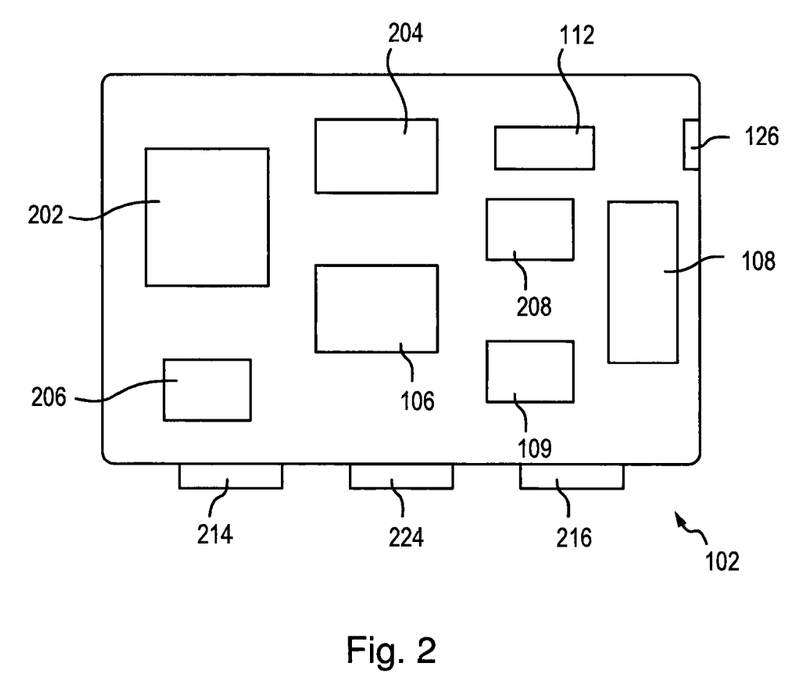
FIG. 2 illustrates, in schematic form, a weigh head apparatus of the weight measurement system of FIG. 1, according to an embodiment of the present invention.

FIG. 2 illustrates, in schematic form, the weigh head apparatus 102 of the weight measurement system as illustrated in FIG. 1, which comprises a power module 202, an analogue signal filtering module 204, the signal converting module 106, the data transmitting/receiving module 108, memory module 112, an amplifier 206 and a CPU 208. The power module 202 provides a power supply for excitation of the load cells 114 and 116 for the load cells to generate the analogue load signal via connectors 214 and 216 respectively and cables (not shown). The analogue signal filtering module 204 filters the analogue load signal and then feeds it to the signal converting module 106 to produce the digital load values 110 using a suitable sampling rate. A connector 224 to a device other than the data processing unit is provided. The weigh head apparatus is operable to relay commands and/or data between the data processing unit and the other device via the connector and a cable. The connector may alternatively be a wireless connector, for example the data transmitting/receiving module 108, as described with reference to FIG. 1.

In this example, the analogue load signal is amplified by an amplifier 206 before being fed to the signal converting module 106 (e.g. a 24-bit analogue-to-digital converter). Transmission of the digital load values 110 from the weigh head apparatus 102 to the data processing unit 104 is operated by the CPU 208 running software (a computer program) and by the data transmitting/receiving module 108 under control of the CPU 208. As illustrated in FIG. 2, the data transmitting/receiving module 108 is integrated within a weigh head housing. In another example, the data transmitting/receiving module 108 is externally provided, such as with a Bluetooth dongle.

The weigh head apparatus software uses the same serial protocol for the physical RS232 port and the Bluetooth serial link. The weigh head apparatus is the communications slave, the external equipment (or phone app) is the master. The default baud rate for the physical link is 9600 baud (1 stop bit, 1 start bit, no parity, no flow control).

The weigh head apparatus is equipped with a single 2 Mbit flash memory 112 which may be used for configuration, event recording and as a buffer for field re-programming.

Commands are sent to the weigh head apparatus from the data processing unit. Examples of commands are:
Set operating mode and reading rate:
Command:
MD 0 (raw digital load values are not sent)
MD N (range 1-50 raw digital load values are sent continuously at N readings per second until mode is changed, or for a fixed duration). This is a transmit stream command.

In Operating Modes>1 the weigh head apparatus will send digital load values to the port continuously. The default settings for this function are:
Actual ADC conversion rate: 50.8 samples/s per channel
Filtered sampling rate: 10 samples/s
Filter: Rectangular FIR, length=10
Weight units native ADC full scale=(2^23)−1
Format: NNNNNNN
Resolution: Approx 0.2 gm on a 1500 kg bar
The data format is:
ch0, ch1 CRLF
The ADC full scale is about (2^23)−1 which implies about 0.2 gm with a 1500 kg load bar but the system noise is much higher than this. The effective resolution allowing for noise is about 1 part in 30000 (50 gm on a 1500 kg bar). Total errors will be higher than this due to the specification of the bar and thermal drift.

The weigh head apparatus can be used, under control of the data processing unit, to measure calibration constants and curves for weigh bars, if these are not pre-determined, for return to the data processing unit:
Command:
CA 0 NNNNNNN (calibrate channel 0, load is NNNNNNN grams)
CA 1 NNNNNNN (calibrate channel 1, load is NNNNNNN grams)
Reply:
Calibrate chan 0: k (k=internal calibration constant)
Sets the time in the weigh head apparatus and is used for timestamping event records.
Command:
TS time (time as hex coded 32-bit integer, seconds since 1970)
Reply:
13/10/2018 14:32:10 (calendar date and time)
The weigh head apparatus has no real time clock so does not know the time until it has been told by the phone app. The weigh head apparatus internal clock does not have to be very accurate (say +/−1%) so will gain or lose as much as 15 minutes in a day. This is adequate for event recording. The weigh head apparatus updates its internal time every second.

Figure 3:
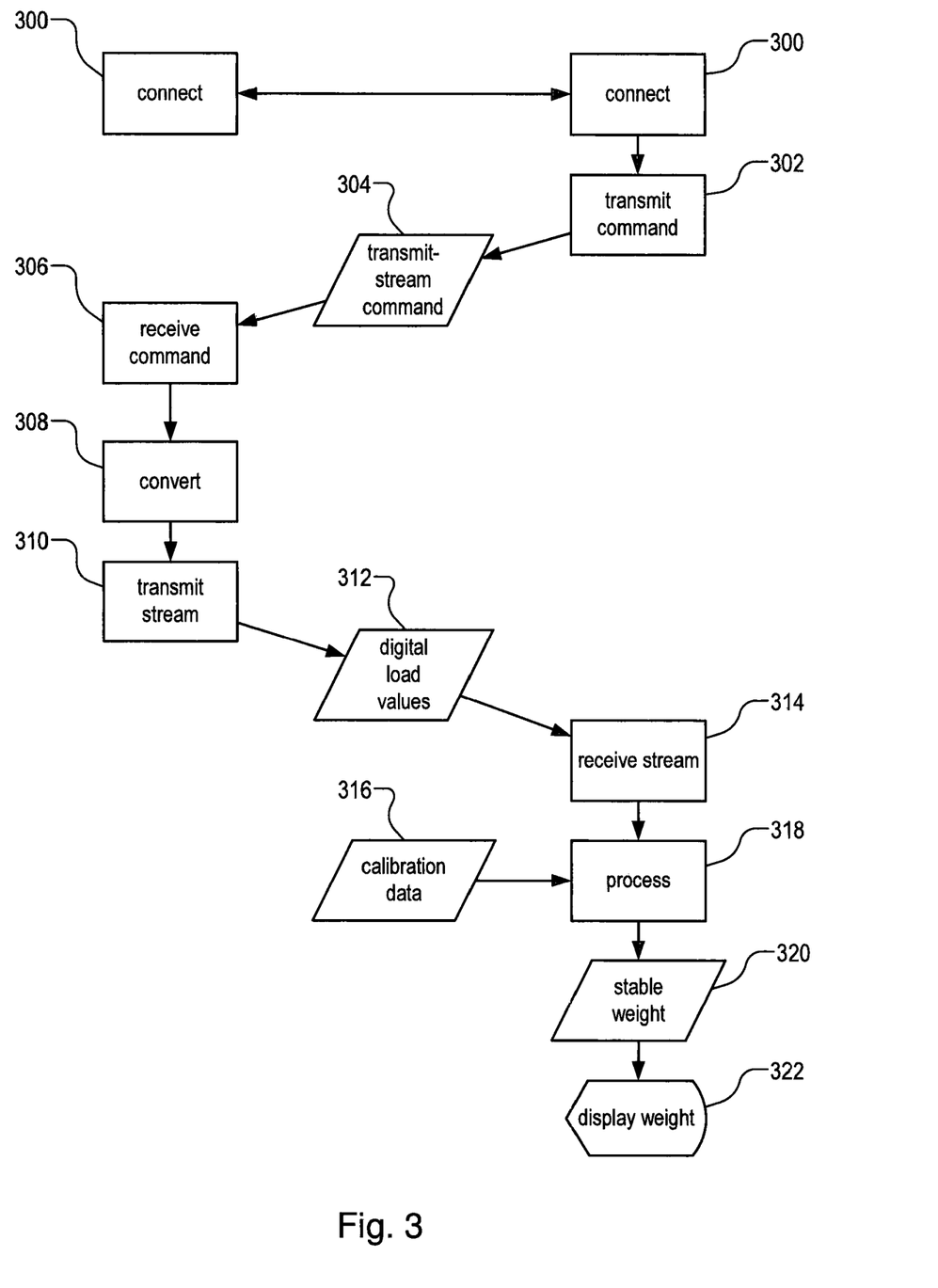
FIG. 3 is a flowchart of a weight measurement method according to an embodiment of the present invention.

FIG. 3 is a flowchart of a method according to an embodiment of the present invention. The weight measurement method is suitable for use in livestock weighing. The method may be implemented in the weight measurement system described with reference to FIG. 1. In FIG. 3, steps performed in the weigh head apparatus 102 are placed at the left-hand side and steps performed by the data processing unit 104 (or cloud server) are placed at the right-hand side. The method has the steps:
300: Wirelessly connecting a data processing unit to a weigh head apparatus. The weigh head apparatus is preferably a communications slave and the data processing unit is a communications master.
302: Wirelessly transmitting a transmit-stream command 304 from the data processing unit to the weigh head apparatus.
306: Receiving the transmit-stream command. An alternative to this and the preceding steps 300 and 302 is automatic connection and broadcasting of the stream of the digital load values triggered by an animal stepping on a platform supported by the weigh bars.
308: Converting one or more analogue load signal into a plurality of digital load values.
310: Transmitting a stream of the digital load values 312 over a wireless connection to the data processing unit. This step may be performed responsive to the receiving of the transmit-stream command. The stream is preferably a real-time stream and the digital load values are raw instantaneous analogue-to-digital converter output values.

314: Wirelessly receiving the stream of digital load values.

318: Processing the stream of digital load values to calculate a measurement of weight 320. The measurement of weight is a stable weight, calculated based on variation of the digital load values, as described above. If the stream of digital load values are uncalibrated (e.g., if the weigh head apparatus has not already factored a calibration constant or curve into the digital load values), then this step includes obtaining calibration data 316. The calibration data 316 may be obtained from memory of the data processing unit and/or wirelessly from the weigh head apparatus and/or from a cloud service. The obtained calibration data is used to calculate the measurement of weight, resulting in a calibrated stable weight 320.

322: The calibrated stable weight 320 is displayed 322 on a screen on the data processing unit.

The method described with reference to FIG. 3 may be implemented by one or more computer program comprising computer readable instructions which, when run on suitable computer apparatus, cause the computer apparatus to perform the method. The computer programs and suitable computer apparatus may be distributed across the system. Steps 300, 314 and 318 are a method of cooperation with a weigh head apparatus that may be implemented by a computer program running on the data processing unit (and optionally processing step 320 on one or more cloud server).

The computer programs may be embodied in computer program products comprising non-transitory computer-readable media, such as disks or flash drives, or embodied in other carriers, including communication signals.

By limiting the tasks performed by embodiments to the minimum necessary to create a viable weighing solution and conducting all remaining tasks/data processing within the mobile device, it has been possible to eliminate a significant number of components. It has also been possible to use components with a reduced specification and thus cost point. Both factors have allowed the stripping a significant amount of cost out of the solution and thus deliver comparable functionality and accuracy with market leading systems but at a much lower cost point, approximately 60% cheaper than conventional weigh heads.

The significant reduction in components of embodiments with a focus on a software-based solution also vastly reduces the environmental impact of the solution.

By structuring the solution so that all data processing is undertaken within the software running on a 3rd party mobile device, embodiments can also be much more flexible as functionality can be increased through a simple release of a new version of the software via the appropriate mobile platform. Conventional systems require locally based weigh head firmware to be updated, which is a much more challenging and potentially restrictive process if the new firmware is not compatible with older versions of the specialist weigh head hardware.

By limiting the functions performed by embodiments to those described herein a truly "future proofed" solution is provided as the weigh head apparatus itself will not become obsolete for much longer as the elements which could in the future require greater processing power or additional hardware support are based on the mobile device which can be easily upgraded with the software and data being migrated between the old and new mobile device simply using the facilities provided by the weigh head apparatus manufacturer or the mobile platform providers.

By processing and storing data on the mobile device using embedded software, the stable weight information can be instantly combined with the full extent of farm data captured by the user. This means that the farmer without any intervention creates a single comprehensive data set which can be analysed to provide business intelligence. Conventional systems being based around specialist hardware on which the data is stored often require direct intervention by the user to export data so that it can be merged with data generated by other systems for analysis.

Embodiments offer a unique progression route for farmers as the tasks performed can be increased through software upgrades to the mobile platform-based elements of the solution which are issued remotely. Users of existing, specialist hardware-based solutions are limited in the additional functions available to them and will often reach a point where they need to purchase a new device in order to meet the new demands of the business. This is not the case with embodiments which can be utilised from entry level all the way to the needs of an advanced user.

As mentioned above, conventional weigh heads that are based around bespoke hardware require new hardware to be purchased in order to increase functionality. Additionally, because the weigh head needs to perform the full range of functions it uses a greater number of components. Both factors have an environmental impact which is addressed with embodiments which require fewer components and do not need to be replaced with a new weigh head in order to increase available functionality.

What is claimed is:

1. A weigh head apparatus for cooperation with a data processing unit for use in livestock weighing, the weigh head apparatus comprising:
    a signal converting module operable to convert one or more analogue load signal into a plurality of digital load values; and
    a data transmitting module operable to transmit a stream of the digital load values over a wireless connection to the data processing unit, wherein, the stream is a real-time stream and the digital load values are raw instantaneous analogue-to-digital converter output values.

2. The weigh head apparatus of claim 1, further comprising a command receiving module configured to receive a transmit-stream command from the data processing unit, wherein the data transmitting module is operable to transmit the stream of the digital load values in response to the received transmit-stream command.

3. The weigh head apparatus of claim 1, further comprising a connector to a device other than the data processing unit and the weigh head apparatus is operable to relay commands and/or data between the data processing unit and the other device.

4. A method for cooperation with a weigh head apparatus for use in livestock weighing, the method comprising:
    wirelessly connecting to a weigh head apparatus;
    wirelessly receiving a stream of digital load values from the weigh head apparatus; and
    processing the stream of the digital load values to calculate a measurement of weight, wherein the stream is a real-time stream and the digital load values are raw instantaneous analogue-to-digital converter output values.

5. The method of claim 4, further comprising wirelessly transmitting a transmit-stream command to the weigh head apparatus, wherein the transmit-stream command is configured to cause the weigh head apparatus to transmit the stream of the digital load values over a wireless connection, and wherein the digital load values are converted by the weigh head apparatus from one or more analogue load signal.

6. The method of claim 4, wherein the measurement of weight is a stable weight, calculated based on variation of the digital load values.

7. The method of claim 4, further comprising obtaining calibration data and using the obtained calibration data to calculate the measurement of weight.

8. The method of claim 7, wherein using the obtained calibration data to calculate the measurement of weight comprises transmitting calibration data wirelessly from the data processing unit to the weigh head apparatus.

9. A weight measurement system for use in livestock weighing, the system comprising:
 a computer apparatus comprising a data processing unit;
 a weigh head apparatus, comprising:
  a signal converting module operable to convert one or more analogue load signal into a plurality of digital load values; and
  a data transmitting module operable to transmit a stream of the digital load values over a wireless connection to the data processing unit,
  wherein the stream is a real-time stream and the digital load values are raw instantaneous analogue-to-digital converter output values;
 and
 one or more computer program executable to:
  wirelessly connect to a weigh head apparatus;
  wirelessly receive a stream of the digital load values from the weigh head apparatus; and
  process the stream of the digital load values to calculate a measurement of weight.

10. A weight measurement method for use in livestock weighing, the method comprising:
 converting one or more analogue load signal into a plurality of digital load values;
 transmitting a stream of the digital load values over a wireless connection to a data processing unit;
 wirelessly receiving the stream of the digital load values; and
 processing the stream of the digital load values to calculate a measurement of weight,
 wherein the stream is a real-time stream and the digital load values are raw instantaneous analogue-to-digital converter output values.

11. The weight measurement method of claim 10, further comprising:
 wirelessly transmitting a transmit-stream command from the data processing unit to a weigh head apparatus; and
 receiving the transmit-stream command, and
 wherein the step of transmitting the stream of the digital load values is performed responsive to the receiving of the transmit-stream command.

12. The weight measurement method of claim 10, wherein the measurement of weight is a stable weight, calculated based on variation of the digital load values.

13. The weight measurement method of claim 10, further comprising obtaining calibration data and using the obtained calibration data to calculate the measurement of weight.

14. The weight measurement method of claim 13, wherein using the obtained calibration data to calculate the measurement of weight comprises transmitting calibration data wirelessly from the data processing unit to the weigh head apparatus.

* * * * *